United States Patent [19]
Sausaman

[11] 3,951,916
[45] Apr. 20, 1976

[54] EPOXY RESIN COMPOSITION HAVING IMPROVED WETTING PROPERTIES

[75] Inventor: David K. Sausaman, Terre Haute, Ind.

[73] Assignee: Commercial Solvents Corporation, Terre Haute, Ind.

[22] Filed: May 14, 1974

[21] Appl. No.: 469,715

[52] U.S. Cl.............................. 260/47 EN; 260/18 EP; 260/47 EP; 260/47 EC
[51] Int. Cl.² .................................. C08G 30/14
[58] Field of Search ........... 260/2 N, 47 EN, 47 EP, 260/307 F, 18 PF, 30.4 EP, 18 EP

[56] References Cited
UNITED STATES PATENTS

| | | | |
|---|---|---|---|
| 3,310,503 | 3/1967 | Huwyler | 260/2 |
| 3,738,992 | 6/1973 | Frump | 260/307 |

Primary Examiner—Donald E. Czaja
Assistant Examiner—T. Pertilla
Attorney, Agent, or Firm—Robert H. Dewey; Howard E. Post

[57] ABSTRACT

An improved epoxy resin composition comprising an epoxy resin suitable for adhesive, potting or laminating use mixed with from about 0.1% to about less than 3% of an oxazolidine ester represented by the formula:

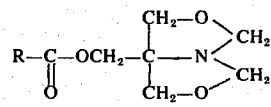

where R is an alkyl or alkenyl group of from 5 to 21 carbon atoms.

4 Claims, No Drawings

EPOXY RESIN COMPOSITION HAVING IMPROVED WETTING PROPERTIES

BACKGROUND OF THE INVENTION

This invention relates to an epoxy resin composition. In a particular aspect, this invention relates to an epoxy resin composition suitable for adhesive, potting or laminating use having improved wetting properties.

In order to obtain a strong bond between two articles bonded by an adhesive, it is essential to obtain good wetting of the surfaces by the bonding agent or adhesive. Bonding to such surfaces as metal and glass (often referred to as hydrophilic surfaces) including glass fibers and products made therefrom, has always been particularly troublesome. The epoxy-based compositions have been the most successful for use on such surfaces, but even so, the bond will sometimes fail due to poor wetting of the hydrophilic surface by the adhesive. Accordingly, a need exists for adhesive compositions having improved wetting properties.

SUMMARY OF THE INVENTION

It is an object of this invention to provide an improved epoxy resin composition.

It is another object of this invention to provide an epoxy resin composition suitable for adhesive, potting or laminating use having improved wetting properties.

Other objects of this invention will be apparent to those skilled in the art from the disclosure herein.

It is the discovery of this invention to provide an improved epoxy resin composition having improved wetting properties on hydrophilic surfaces, e.g. metal, glass including glass fibers and products made therefrom, and having as a wetting agent incorporated therein from about 0.1% to less than about 3% of an oxazolidine corresponding to the formula:

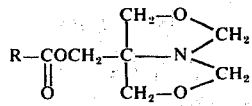

wherein R is alkyl or alkenyl group of from 5 to 21 carbon atoms.

DETAILED DISCUSSION

The oxazolidine esters used in the practice of this invention are known in the art. They are described by John A. Frump in U.S. Pat. No. 3,738,992 which is incorporated herein by reference thereto. These oxazolidine esters are prepared from the corresponding hydroxymethyl oxazolidine which is disclosed by Wm. B. Johnston, U.S. Pat. No. 2,448,890, also incorporated herein by reference thereto. The hydroxymethyl oxazolidine is also commercially available from Commercial Solvents Corp., New York, N. Y. 10017 under the designation "Oxazolidine-T".

The preferred esters for the practice of this invention are those wherein R has from 9 to 16 carbon atoms, and the particularly preferred ester is the laurate, i.e. where R is an alkyl group of 11 carbon atoms. Esters of mixed fatty acids, which the most economical, are also useful and are in fact particularly preferred. The amount of Oxazolidine-T ester to be added to the epoxy resin is about 0.1% to less than about 3%, preferably about 1 to 2%. As much as 3% results in a weaker bond.

The epoxy resin suitable for the practice of this invention can be any of the epoxy resins customarily used in the art in adhesives. Generally the resins usually used are 1,2,- epoxy resins prepared from bisphenol A and epichlorohydrin and having an epoxide equivalent of from 170 to 1000. Such resins are discussed by H. Lee and K. Neville in "Epoxy Resins, Their Application and Technology", McGraw-Hill Book Co., New York, N. Y.

Such resins include but are not limited to the ERL, ERLA, EKRA, and EKRD resins marketed by Bakelite Co.; the ARALDITE line of resins, except ARALDITE 6097 and 6099, marketed by Ciba-Geigy Co., Inc.; the DER resins, except DER 667, marketed by the Dow Chemical Co.; the EPI-REZ line, except the 540 and 550 resins, marketed by Jones-Dabney Co.; and the EPON resins, except EPON 1007, 1009 and 1310, marketed by the Shell Chemical Co.

Some of these resins are liquids at room temperature but many of them are solids. They can be applied as hot melts or as solutions in suitable solvents, many of which are known. Suitable solvents include the ketones, such as methyl ethyl ketone and methyl isobutyl ketone, aromatics such as toluene and xylene, lower aliphatic alcohols, esters and glycol ethers. The practice of this invention is independant of the solvent used, if any, and it is not intended that the invention be limited thereby.

As is known, epoxy resins do not of themselves form an adhesive bond, but instead must be mixed within a few hours of use with a cross-linking agent, usually an amine or polyamine, such as ethylene diamine and the like, or a polyamide or acid anhydride. A large number of cross-linking agents are well-known in the art and are discussed by H. Lee and K. Neville, op. cit. The practice of this invention is independant of the cross-linking agent and it is not intended that the invention be limited in any way by the cross-linking agent selected at the time of use.

The oxazolidine ester can be added to the resin at any time before use and mixed well with the epoxy resin; preferably, as a matter of convenience, the ester is mixed with the resin prior to packaging. Furthermore, additional advantages are obtained thereby. It was observed that the ester contributes lubricity to the resin, making it easier to handle. Thus the steps of mixing with the cross-linking agent, filling a mold, deaerating, spreading, etc. are facilitated. Also, lower pump pressures are required to maintain a desired rate of flow.

The invention will be better understood by reference to the following examples. These examples are presented for purposes of illustration only, and it is not intended that the invention be limited thereby.

EXAMPLE 1

There was prepared a mixture of an epoxy resin of the bisphenol A - epichlorohydrin type having an epoxide equivalent of 180–195 (epoxy resin ERL-2774 marketed by Union Carbide Corp. was the resin used) and triethylene tetramine in a 10:1 by weight ratio. The mixture was divided into four parts. One part was retained as control; to the second there was added 1% by weight of the lauric acid ester of Oxazolidine-T; to the third part was added 2% by weight of the lauric acid ester of Oxazolidine-T; and to the fourth part was added 3% of the lauric acid ester of Oxazolidine-T.

Of each of the above mixtures, 0.8 ml was spread on one surface of 160 mm² of a ½ inch steel nut and a second ½ inch steel nut was placed in intimate contact therewith. After aging 24 hours at ambient temperature, a 3 × ½ inch bolt was threaded through each of the nuts until they met at the interface. One of the bolts was then securely strapped into a holding jig in a horizontal position and weights were incrementally added to the other bolt until the bond failed. Each of the mixtures was tested in quadruplicate. The results obtained are as follows (the figures in parentheses were believed to be atypical and were discarded for calculating averages):

| Oxazolidine,% | 0 | 1 | 2 | 3 |
|---|---|---|---|---|
| Breaking load, kg. | (22.51) | 20.20 | 18.00 | 9.78 |
| | 18.90 | 20.29 | 19.57 | 10.20 |
| | 17.50 | 22.96 | 21.65 | (18.13) |
| | 16.73 | (10.88) | 17.75 | <9.78 |
| Av. | 17.71 | 21.15 | 19.24 | 9.92 |

These results show that up to 2% oxazolidine ester increases the strength of the bond but as much as 3% or more is deleterious.

EXAMPLE 2

The experiment of Example 1 is repeated in all essential details except that the stearic acid ester of Oxazolidine-T is substituted for the lauric acid ester. At 1 or 2% concentrations, the strength of the bond is improved.

EXAMPLE 3

The experiment of Example 1 is repeated in all essential details except that the oleic acid ester of Oxazolidine-T is substituted for the lauric acid ester. At 1 or 2% concentration, the strength of the bond is improved.

EXAMPLE 4

The experiment of Example 1 is repeated in all essential details except that the pelargonic acid ester of Oxazolidine-T is substituted for the lauric acid ester. At 1 or 2% concentration, the strength of the bond is improved.

EXAMPLE 5

The experiment of Example 1 is repeated in all essential details except that the oxazolidine ester is prepared from a commercial grade of coconut oil fatty acids having the following composition:

| ACID | % |
|---|---|
| Capyrlic | 4 |
| Capric | 5 |
| Lauric | 48 |
| Myristic | 20 |
| Palmitic | 10 |
| Stearic | 2 |
| Oleic | 10 |
| Linoleic | 1 |

At 1 or 2% concentration the strength of the bond is improved.

EXAMPLE 6

The experiment of Example 1 is repeated in all essential details except that ARALDITE-6075, having an epoxide equivalent of 690 and a melting point of 84°C, marketed by Ciba-Geigy Co., Inc., is substituted for the ERL-2774 resin. The epoxy is heated to above its melting point, the oxazolidine ester is added and mixed well, and the adhesive is tested as described. At 1 or 2% concentration, the bond is stronger than without the Oxazolidine-T ester.

I claim:
1. A composition consisting essentially of a 1,2-epoxy resin having an epoxide equivalent of from about 170–1000, a curing agent therefor, and from about 0.1 to about 3% of an oxazolidine ester represented by the formula:

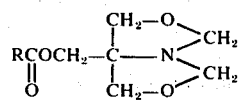

wherein R is an alkyl or alkenyl group of from 5 to 21 carbons.
2. The composition of claim 1 wherein R is an alkyl group of 11 carbon atoms.
3. The composition of claim 1 wherein the Oxazolidine ester is present at a concentration of about 2%.
4. The composition of claim 1 wherein the ester group is supplied by mixed fatty acids having from 6 to 18 carbon atoms.

* * * * *